O. A. FORD.
PROCESS AND APPARATUS FOR THE CONVERSION OF PEAT, LIGNITE, AND OTHER CARBONACEOUS SUBSTANCES INTO ARTIFICIAL COAL.
APPLICATION FILED SEPT. 23, 1916. RENEWED NOV. 4, 1921.
1,426,723.
Patented Aug. 22, 1922.
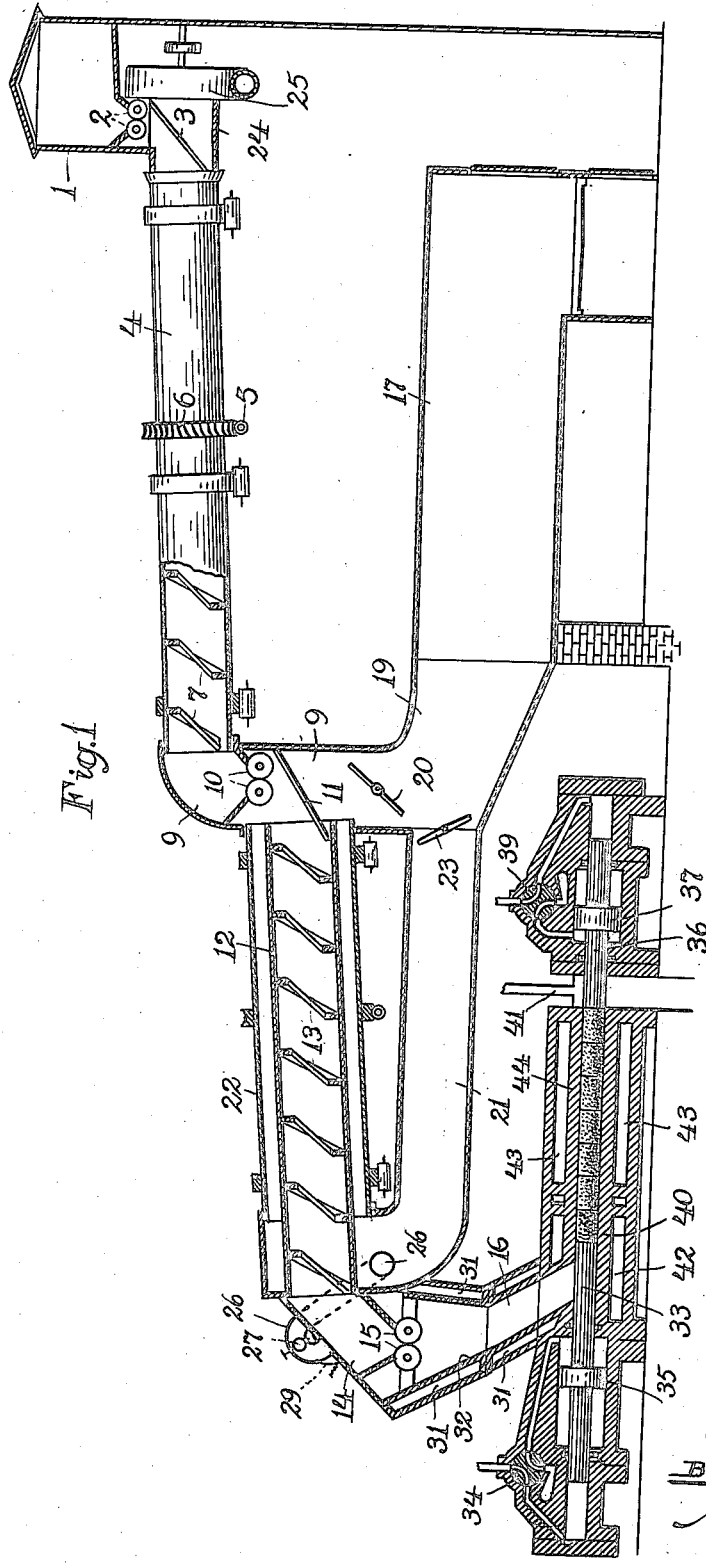
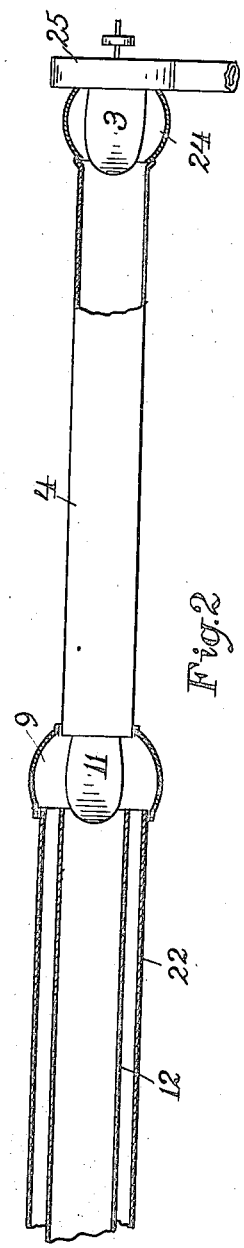
Inventor,
Olpha A. Ford;
By A. B. Upham,
Attorney.

UNITED STATES PATENT OFFICE.

OLPHA A. FORD, OF MALDEN, MASSACHUSETTS, ASSIGNOR OF ONE-HALF TO MARGARET J. THOMPSON, OF KENNEBUNK, MAINE.

PROCESS AND APPARATUS FOR THE CONVERSION OF PEAT, LIGNITE, AND OTHER CARBONACEOUS SUBSTANCES INTO ARTIFICIAL COAL.

1,426,723.  Specification of Letters Patent.  Patented Aug. 22, 1922.

Application filed September 23, 1916, Serial No. 121,877. Renewed November 4, 1921. Serial No. 512,940.

*To all whom it may concern:*

Be it known that I, OLPHA A. FORD, a citizen of the United States, and a resident of Malden, in the county of Middlesex and State of Massachusetts, have invented certain new and useful Improvements in Processes and Apparatus for the Conversion of Peat, Lignite, and other Carbonaceous Substances into Artificial Coal, of which the following is a specification.

In the conversion of peat, lignite and other carbonaceous substances into coal, there are two main steps, the first comprising the extraction of the larger part of the moisture contained therein, and the rupture of the cellular tissue thereof, and the second consisting of the formation of the treated material into briquets.

In drying the material, I prefer to employ the hot gases arising from a furnace, and to have the same pass first about a drum through which the material is being fed, and then in contact with the latter while on its way to the drum. Although this obviates the difficulty which I have found to exist, that of setting the dried material on fire when the hot gases pass over the entire train of drying material, it still fails to overcome another trouble which I have discovered, and which consists in rolling the material into spheres or balls having hard impervious exteriors but an interior which no amount of treatment can affect.

Having learned this, I then saw that by giving the material a partial drying, breaking up these spheres, giving the same a further drying, and then a final grinding preliminary to the briquetting, the entire problem was solved. In the description of my process and of my apparatus for carrying the same into effect, I have specified peat as the material treated, but lignite and other carbonaceous substances can be similarly treated.

The apparatus which I prefer to employ for carrying my process into effect is shown in the drawings forming part of this specification, in which Figure 1 is a side view of the apparatus, partially in section. Figure 2 is a plan view of a portion thereof, also partially in section.

The material, as peat partially dried atmospherically or otherwise, is delivered from the bin 1 through suitable feed and crushing rolls 2 upon an inclined chute 3 beneath, and thence to a drum 4 rotated in any proper way, as by a worm 5 and annular rack 6. This drum is slightly inclined and provided with a helical rib 7 within it, in order to induce a slow progression of the peat to the drum's lower end. At this lower end is a fixed chamber 9 containing grinding rolls 10 which receive and pulverize the partially dried peat.

Below these rolls 10 is a chute 11 which delivers the ground partially dried peat to a second slightly inclined drum 12 provided with a helical rib 13. At the lower end of this drum is a fixed chamber 14 containing grinding rolls 15 beneath which is a chute or hopper for delivering the dehydrated, pulverized and chemically affected peat to the press.

For thus extracting the moisture from and for otherwise converting the peat into elements which subsequent treatment can form into a solid homogeneous mass corresponding both physically and chemically to the best anthracite coal, I prefer to employ the hot products of combustion conducted from a furnace or a battery of furnaces 17 to the drums 4 and 12. Such gases proceed through a neck 19 provided with a damper 20, to the chamber 9. A conduit 21 extends from the neck 19 to the drum 12 and connects with an annular space between the exterior of the drum and a shell 22 surrounding the drum, but made to revolve with the latter, not because of any advantage to be derived from moving the shell but because of structural conditions.

This conduit 21 is also provided with a damper, at 23, in order to properly apportion the hot products of combustion from the furnace between the two drums.

To enable the hot gases to pass by the feed chute 11 and the grinding rolls 10, the chamber 9 is laterally enlarged, as shown in Fig. 2, and is thereby made to provide ample passageway. Similarly, the chamber 24 containing the feed chute 3 is laterally widened to enable the gases from the drum 4 to pass to a suction fan 25 employed for the purpose of increasing the draft of the furnaces and for hastening the passage of the gases about and through the drums.

The operation of the drying and grinding portion of the apparatus is as follows: As the peat is fed through the rolls 2 to the drum 4, it slowly travels down the latter to its lower end, and is partially dried, but, unfortunately, under the rolling action of the rotating drum it is formed into spheres or pebbles of various sizes, but each one characterized by having a hard impervious exterior enclosing a moist partially unaffected core.

These pebbles descend to the grinding rolls 10 and by the latter are entirely disintegrated and converted into substantially a powder. This is delivered to the drum 12, and in contact with its hot surface is still further dried. Though it may again ball up or form itself into pebbles to a greater or less extent, its contained moisture is sufficiently expelled to enable it, after being again ground, to be compressed into briquets.

By having the hot gases pass about the exterior of the drum 12 instead of through the same, we obviate the danger of initiating combustion in the peat, since in this second drum the peat has become so nearly dry as to be liable to such an effect.

Inasmuch, however, as it is necessary to maintain a circulation through the drum 12 in order to carry away the moisture from the drying peat, the chamber 14 is made a mixing chamber into which suitable quantities of atmospheric air and of hot gases can be admitted and intermixed and then delivered to the drum. To this end, a suitable conduit, as the pipe 26, passes from the conduit 21 around and into the chamber 14. A damper 27 in this pipe and an opening adjustably closed by a flap 29, permit of the entrance into the chamber of the proper quantities of atmospheric air and of hot gases to maintain a safe but ample current through the drum 12.

The dried peat, given its final crushing by the grinding rolls 15, descends to the delivery hopper 16 at the lower end of which is the press for compressing the peat into briquets. This hopper is surrounded with a steam jacket 31, and one entire surface 32 is inclined to cause the peat to descend in contact therewith up to the very moment of delivery to the press.

The press comprises a plunger 33 operated by hydraulic pressure controlled by a rotary valve 34. Upon this plunger is a shoulder 35 against one face of which the water or other fluid is forced to retract the plunger back from below the hopper 16, while the fluid pressure against the rear end of the plunger causes it to forcibly advance and compress the peat which has descended in front of it.

To provide compressive opposition to the forward push of the plunger 33, a secondary plunger 36 is located in line with the primary plunger 33, and operated in a similar manner, having a shoulder 37 and a valve 39.

The valves 34 and 39 being suitably timed, the secondary plunger 36 is advanced to the position shown in the drawings, and held there. The primary plunger 33 having been retracted to its rearmost position to permit peat to descend in front thereof, it is then forced steadily toward the secondary plunger, compressing this quantity of loose peat between its end and the briquets previously formed in the plunger cylinder 40, the secondary plunger holding said briquets firmly in place.

As shown in Fig. 1, the plunger 33 has its cylinder surrounded by water-receiving chambers, one of which is for hot water or steam, and the other for cold water, the heated chamber being for the purpose of heating the cylinder into which the peat is first delivered, while the cold water is for the purpose of cooling the peat during the last step of its compression and its delivery to the secondary plunger 36. The heating serves to aid in the cohesion of the material under initial compression while the final cooling aids in fitting the compressed peat for exposure to the atmosphere.

The secondary plunger now retreats to its rearmost position, and the primary plunger completes its stroke from the point shown in Fig. 1 until it has forced the outermost briquet out from the cylinder and beneath the detacher 41. The primary plunger begins its retraction; the detacher descends, forcing the briquet down or elsewhere to a suitable receptacle; the secondary plunger returns to its illustrated position, and the cycle of operations continues as before.

As above set forth, the intermediate grinding of the peat breaks up all the balls or pebbles thereof formed during the preliminary drying, and so makes it possible to give the requisite dehydration to the same in the final drying. After this final drying, at a temperature carefully adjusted to be at as high a degree as necessary without igniting the nearly dried peat, the latter is reground and delivered through a heated channel to the press.

Said channel or hopper 16 is surrounded by a jacket 31 to which steam is delivered, and by which the hot dried peat is maintained at a sufficient temperature, usually 212°, up to its delivery to the press. Further, the section of the press where the compression of the peat takes place is itself maintained at a proper temperature by a steam jacket 42. By thus keeping the parts suitably hot, the peat itself and the chemical elements therein are all enabled to be compressed into a solid powerfully coherent whole.

The above described sudden compression of the mass of hot dehydrated peat, which heat is further increased by the compression, acts to combine effectively all the solid, gaseous and fluid-filled elements into a coherent whole, which subsequent exposure to a freezing temperature acts to chill, condense, harden and seal the same into a solid body, which exhibits a complete change to a crystalline form showing all the characteristics of true coal, even to the conchoidal or shell-like fracture and brittleness of the latter. This chilling is accomplished by any suitable means, as by the cylinder 44 which is cooled by a refrigerating liquid circulating in the space 43.

What I claim is:

1. The herein described process of converting peat, lignite and other carbonaceous substances into artificial coal, which consists in subjecting the material to the action of hot products of combustion, and following the same by subjecting the material to an intermixed stream of atmospheric air and hot products of combustion, and subjecting the material during the second treatment to indirect heating.

2. The herein described process of converting peat, lignite and other carbonaceous substances into artificial coal, which consists in subjecting the material to the action of hot products of combustion, then grinding the same, subjecting it to an intermixed stream of atmospheric air and hot products of combustion, subjecting the material during the second drying to indirect heating, and subjecting the material to a rolling action during each drying, and again pulverizing the material and finally compressing it into blocks.

3. The herein described means for converting peat, lignite and other carbonaceous substances into artificial coal, comprising means for giving the material a preliminary dehydration, means for giving to the material a second dehydration, means for receiving the material from the first dehydrating means, pulverizing it and delivering it to the second dehydrating means, means for receiving the material from the second dehydrating means and giving it a final pulverization, and means for variably delivering intermixed atmospheric air and hot products to the second dehydrating means, said pulverizing means being in the direct path of travel of the gases and material, and both being at all times enclosed within the kiln body.

4. The herein described means for converting peat, lignite and other carbonaceous substances into artificial coal, comprising an elevated rotative drum adapted to receive and deliver the material at its respective ends, a pulverizing device located to receive the material from said drum, a second drum located to receive by gravity the pulverized material from said device, a second pulverizing device located to receive the material from the second drum, means for delivering hot products of combustion to the first drum and to the space about the second drum, and chambers having laterally spaced walls enclosing said pulverizing means respectively and adapted to permit the unimpeded passage past the latter to the drums of the hot products of combustion.

In testimony that I claim the foregoing invention, I have hereunto set my hand this 20th day of September, 1916.

OLPHA A. FORD.